UNITED STATES PATENT OFFICE.

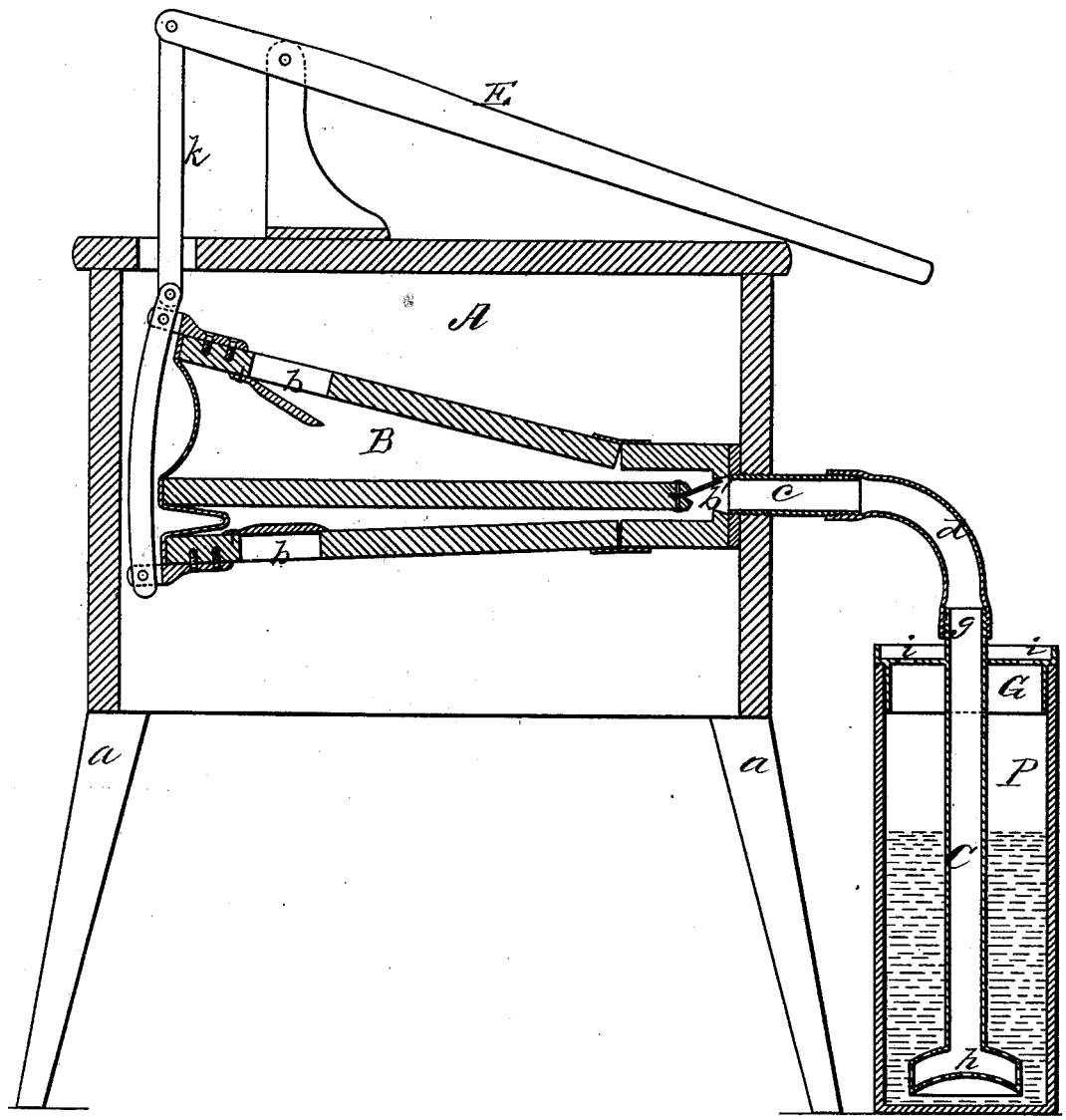

SILAS R. OWEN AND FRANK M. MAHAN, OF ST. JOSEPH, MISSOURI.

IMPROVEMENT IN ATMOSPHERIC CHURNS.

Specification forming part of Letters Patent No. 206,124, dated July 16, 1878; application filed June 1, 1878.

*To all whom it may concern:*

Be it known that we, SILAS R. OWEN and FRANK M. MAHAN, of St. Joseph, in the county of Buchanan and State of Missouri, have invented a new and valuable Improvement in Atmospheric Churns; and we do hereby declare that the following is a full, clear, and exact description of the construction and operation of the same, reference being had to the annexed drawings, making a part of this specification, and to the letters and figures of reference marked thereon.

The drawing is a representation of a vertical central section of our improved churn.

This invention has relation to improvements in churns; and the nature of the invention consists in the combination, with a cream-holding vessel, of a rose located therein, a blower or bellows, and a pipe connecting the rose and bellows, whereby, when said bellows is operated, air is forced within the vessel, all as hereinafter fully shown and described.

In the annexed drawings, the letter A designates a rectangular box or frame, constructed in the ordinary manner, and supported by legs $a$. In the interior of this box or frame is seated an ordinary bellows, B, having two receiving-valves, $b$, and a regulating-valve, $b'$, for the discharge of air in its throat. $c$ designates a small metallic pipe extending from the discharge end of the bellows out through the end wall of box A, to which it is secured, and $d$ designates a rubber pipe removably secured thereto, and having its free end provided with an ordinary hose-coupling, $g$.

P designates an ordinary churning-vessel, and C a metallic tube adapted to be received in said vessel, and provided at its lower end with a rose, $h$. The upper end of tube C is female screw-threaded, and is provided with a metallic stopper, G, having perforations $i$ extending through it, and adapted to be received in the neck of the churning-vessel.

If we so elect, tube C may be made in sections, so as to allow of its being taken apart and cleaned.

E designates an ordinary lever, and $k$ a pitman, one end of which is pivoted to the lever, and the other in like manner to the end of the bellows within the box or frame.

The operation of our improved churn is as follows: The cream having been put in vessel P, and pipe $d$ coupled to tube C, as shown, by alternately depressing and raising the lever, air is forced through pipe $d$, thence downward through tube C in vessel P, out through the perforations in the rose at the bottom of the vessel, when it will rise through the cream and escape through perforations in the stopple G, thus subjecting the cream to a thorough and violent agitation. The butter-cells receive the cooling contact of pure air, by which means the butter is set free in the most perfect state of granulation in an incredibly short space of time, and a very superior quality of butter is obtained.

If we so desire we may place a coil-spring, $t$, on the end of lever E, thus assisting the operator in producing the upward stroke of the lever.

What we claim as new, and desire to secure by Letters Patent, is—

The combination, with a cream-holding vessel, of a rose located therein, a blower or bellows, and a pipe connecting the rose and bellows, whereby air is forced within the vessel, substantially as specified.

In testimony that we claim the above we have hereunto subscribed our names in the presence of two witnesses.

SILAS R. OWEN.
FRANK M. MAHAN.

Witnesses:
J. C. OGDEN,
C. HARTZELL.